(12) United States Patent
Cheng

(10) Patent No.: US 12,537,438 B2
(45) Date of Patent: Jan. 27, 2026

(54) SWITCH CONTROL MODULE OF SWITCH MODE POWER SUPPLY

(71) Applicant: INFSITRONIX TECHNOLOGY CORPORATION, Hsinchu County (TW)

(72) Inventor: Yuan-Kai Cheng, Hsinchu County (TW)

(73) Assignee: INFSITRONIX TECHNOLOGY CORPORATION, Hsinchu County (TW)

( * ) Notice: Subject to any disclaimer, the term of this patent is extended or adjusted under 35 U.S.C. 154(b) by 239 days.

(21) Appl. No.: 18/100,067

(22) Filed: Jan. 23, 2023

(65) Prior Publication Data
US 2023/0369962 A1    Nov. 16, 2023

Related U.S. Application Data

(60) Provisional application No. 63/266,995, filed on Jan. 21, 2022.

(51) Int. Cl.
*H02M 1/088* (2006.01)
*H02M 7/539* (2006.01)

(52) U.S. Cl.
CPC ........... *H02M 1/088* (2013.01); *H02M 7/539* (2013.01)

(58) Field of Classification Search
CPC ...... H02M 7/539; H02M 7/5395; H02M 7/54; H02M 7/56; H02M 7/60
See application file for complete search history.

(56) References Cited

U.S. PATENT DOCUMENTS

2003/0174528 A1*  9/2003  Wong .................... H02M 3/156
                                                    363/147

\* cited by examiner

*Primary Examiner* — Nguyen Tran
(74) *Attorney, Agent, or Firm* — WPAT, PC

(57) ABSTRACT

A switch control module for a switch mode power supply comprising a biased switch, an active switch and a control unit. The biased switch comprises a first node and a second node. The first node is coupled to a primary side winding. The active switch is connected to the second node. The control unit controls the ON/OFF states of the active switch and the biased switch is biased to be turned on initially. In this way, the active switch and the control unit are less likely to be damaged by voltage spikes generated by leakage in the primary side winding.

11 Claims, 10 Drawing Sheets

US 12,537,438 B2

SWITCH CONTROL MODULE OF SWITCH MODE POWER SUPPLY

FIELD OF THE INVENTION

The present application is related to a switch control module for a switch mode power supply, in particular to the switch control module for reducing voltage spikes in the switch mode power supply.

BACKGROUND OF THE INVENTION

Compared to other types of power converters, switch mode power supplies (SMPS), for example, flyback power converters, own simple circuit architectures and higher energy conversion efficiency. In addition, switch mode power supplies also may provide multiple current outputs with high efficiency. Thereby, switch mode power supplies are widely applied to various products.

Please refer to FIG. 1, which shows a schematic diagram of the switch mode power supply according to one of the prior arts. The switch mode power supply according to the prior art comprises a winding unit 9. The winding unit 9 comprises a primary side winding $N_P$ and a secondary side winding $N_S$. Ideally, when the control unit turns off the switch transistor $SW_1$, all the energy stored in the primary side winding $N_P$ will be totally converted to the secondary side winding $N_S$ to form the output voltage $V_{OUT}$ for the load. Unfortunately, practically, there exists the leakage inductance $L_{LK}$ in the primary side winding $N_P$. The energy stored in the leakage inductance $L_{LK}$ cannot be converted effectively to the secondary side winding $N_S$. Instead, a voltage spike will be generated at a first node $n_1$ of the switch transistor $SW_1$. To avoid damage on the switch transistor $SW_1$ caused by the voltage spike, a switch mode power supply adopts a snubber 91 containing a resistor $R_S$, a capacitor $C_S$, and a diode $D_S$ to lower the voltage spike.

The switch mode power supply according to the prior art uses external components to implement the snubber 91. In fact, the energy stored in the leakage inductance $L_{LK}$ is dissipated passively by these external components. It can be observed that the voltage at a second node $n_2$ of the snubber 91 is essentially identical to the voltage at the first node $n_1$, meaning that the external components in the snubber 91 should meet the stringent requirements in voltage tolerance. This design is simple with the expense of unavoidable energy waste. Besides, the energy stored in the leakage inductance $L_{LK}$ can be roughly expressed by:

$$P_{L_{LK}} = \frac{1}{2} \times L_{LK} \times I_{PK}^2 \times f_{SW_1}$$

where $I_{PK}$ is the peak current flowing through the switch transistor $SW_1$; $f_{SW_1}$ is the switching frequency of the switch transistor $SW_1$. Thereby, if the power of a switch mode power supply is designed highly, the energy stored in the leakage inductance $L_{LK}$ will be increased significantly. Then the requirements in the specifications of the components in the snubber 91 must be increased correspondingly. In addition, setting additional heat dissipation devices is necessary for the snubber 91, leading to a substantial increase in the overall manufacturing cost.

To solve this problem, according to the U.S. Pat. No. 10,622,879, when the switch transistor is turned off, the connection between the primary side winding and the power source terminal of the control unit is turned on for supplying an operation current to the control unit and thus avoiding energy waste and reducing the number of external components. In low to medium power applications, this patent might performs well. Nonetheless, for high power applications, there still exists the voltage spike problem and thus electronic components with medium to high voltage tolerance are required.

Accordingly, how to reduce the costs for the external components in a switch mode power supply while achieving the effect of lowering voltage spikes is still an unsolved issue in the art.

SUMMARY OF THE INVENTION

An objective of the present application is to provide a switch control module for a switch mode power supply, in which the primary side winding is connected in series with a biased switch and an active switch. Thereby, the active switch and the control unit can be manufactured by using components with lower voltage tolerance and not vulnerable to the voltage spikes generated by the leakage inductance of the primary side winding.

To achieve the above objective, the present application discloses a switch control module applied to a switch mode power supply. The switch mode power supply comprises a primary side winding and a secondary side winding. The switch control module comprises a biased switch, an active switch, and a control unit. The biased switch comprises a first node and a second node. The first node is coupled to the primary side winding. The active switch is connected to the second node. The control unit is connected to the active switch for controlling a switch state of the active switch. Besides, the biased switch will be biased to be turned on.

DETAILED DESCRIPTION OF THE INVENTION

In the specifications and subsequent claims, certain words are used to represent specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" comprises any direct and indirect electrical connection. Thereby, if the description is that a first device is coupled to a second device, it means that the first device is connected electrically to the second device directly, or the first device is connected electrically to the second device via other devices or connecting means indirectly.

Figure 2A:
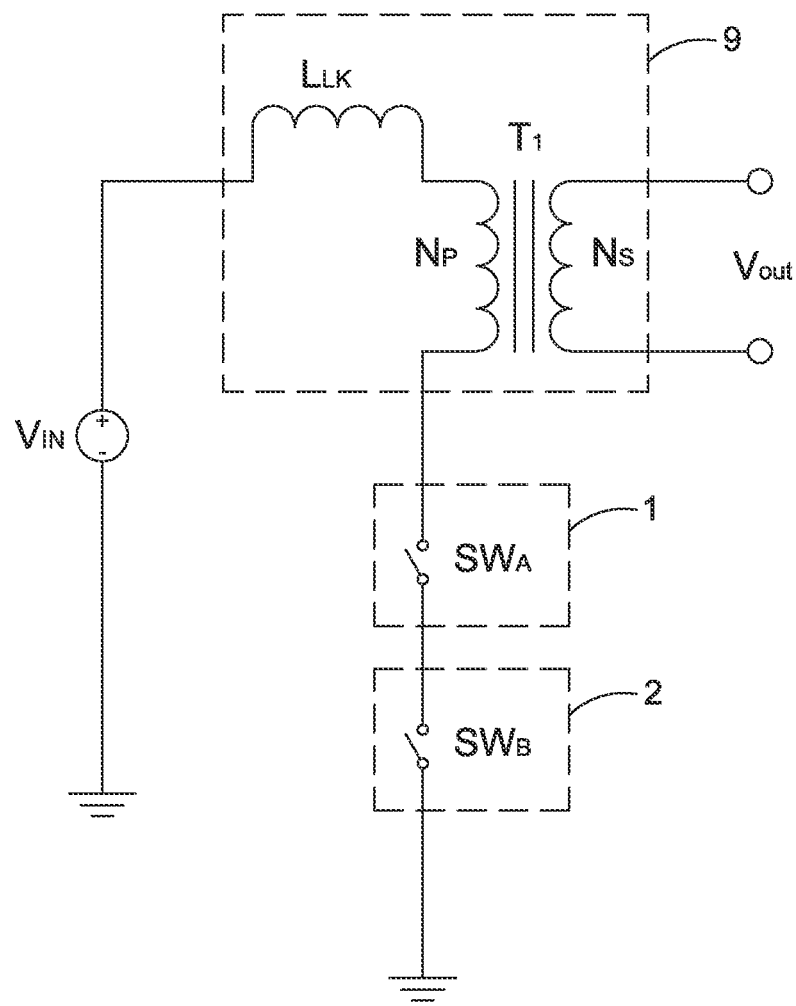
FIG. 2A shows a schematic diagram of the architecture for the switch control module for the switch mode power supply according to an embodiment of the present application.

Please refer to FIG. 2A, which shows a schematic diagram of the architecture for the switch control module for the switch mode power supply according to an embodiment of the present application. The switch mode power supply comprises a winding unit 9, which comprises a primary side winding $N_P$ and a secondary side winding $N_S$. Furthermore, the leakage inductance $L_{LK}$ represents the nonideal component of the primary side winding $N_P$. The primary side winding $N_P$ and the secondary side winding $N_S$ are normally regarded as a transformer $T_1$. The primary side winding $N_P$ can receive an input power source $V_{IN}$, which is normally formed by rectifying the external alternate-current power source. The switch control module for the switch mode power supply connects a biased switch $SW_A$ to an active switch $SW_B$ in series. The biased switch $SW_A$ is connected between the primary side winding $N_P$ and the active switch $SW_B$. Then the active switch $SW_B$ is coupled to the ground. The biased switch $SW_A$ can be formed by the switch transistor adopted in the prior art. Nonetheless, according to the prior art, the control unit controls the switch state of the switch transistor. On the contrary, according to the various embodiments of the present application, the biased switch $SW_A$ is pre-biased to the turn-on state. Since the biased switch $SW_A$ and the active switch $SW_B$ are connected in series, when the active switch $SW_B$ is turned off, no current will flow through the biased switch $SW_A$. At this moment, the node voltage of the biased switch $SW_A$ is in the turn-off state correspondingly. In other words, the switch state of the biased switch $SW_A$ is controlled by the switch state of the active switch $SW_B$.

Figure 2B:
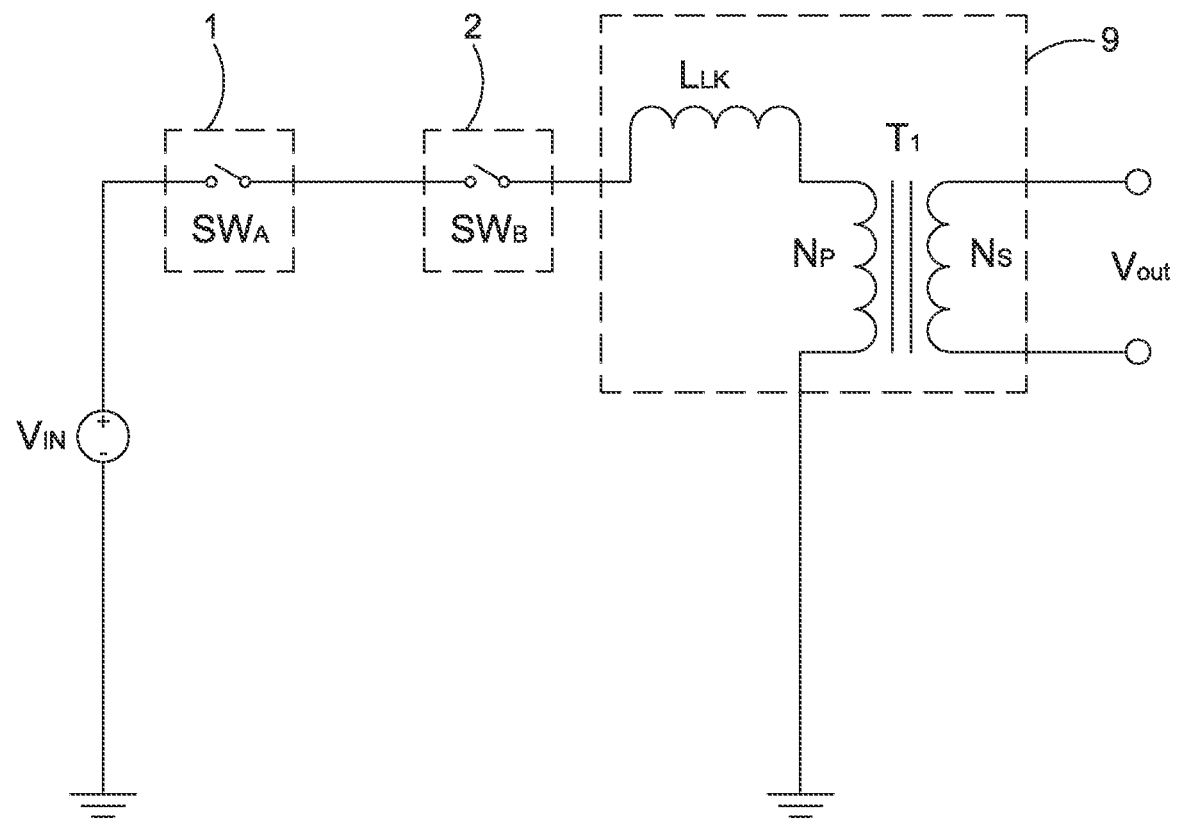
FIG. 2B shows a schematic diagram of the architecture for the switch control module for the switch mode power supply according to another embodiment of the present application.

To elaborate, in FIG. 2A, the biased switch $SW_A$ and the active switch $SW_B$ are connected in series to the low side of the primary side winding $N_P$. Nonetheless, as shown in FIG. 2B, according to another embodiment of the present application, the biased switch $SW_A$ and the active switch $SW_B$ are connected in series to the high side of the primary side winding $N_P$. The biased switch $SW_A$ is connected between the primary side winding $N_P$ and the active switch $SW_B$. Then the active switch $SW_B$ is coupled to the input voltage $V_{IN}$. Since the biased switch $SW_A$ and the active switch $SW_B$ are connected in series to the primary side winding $N_P$, the placement of the components does not influence the operation. Thereby, in the subsequent embodiments of the present application, the architecture shown in FIG. 2A is used as an example for description. Nonetheless, the present application is not limited to the architecture.

When the switch control module for the switch mode power supply according to the present application is operating, the control unit will turn on the active switch $SW_B$ periodically. Because the biased switch $SW_A$ is biased to the turn-on state, the primary side winding $N_P$ will store the energy from the input power source $V_{IN}$. When the active switch $SW_B$ is turned off, the current will no longer flow through the biased switch $SW_A$ and the active switch $SW_B$. At this moment, the primary side winding $N_P$ will transfer energy to the secondary side winding $N_S$ to discharge the secondary side winding $N_S$ and form the output voltage $V_{OUT}$ at the output for the load.

Figure 3A:
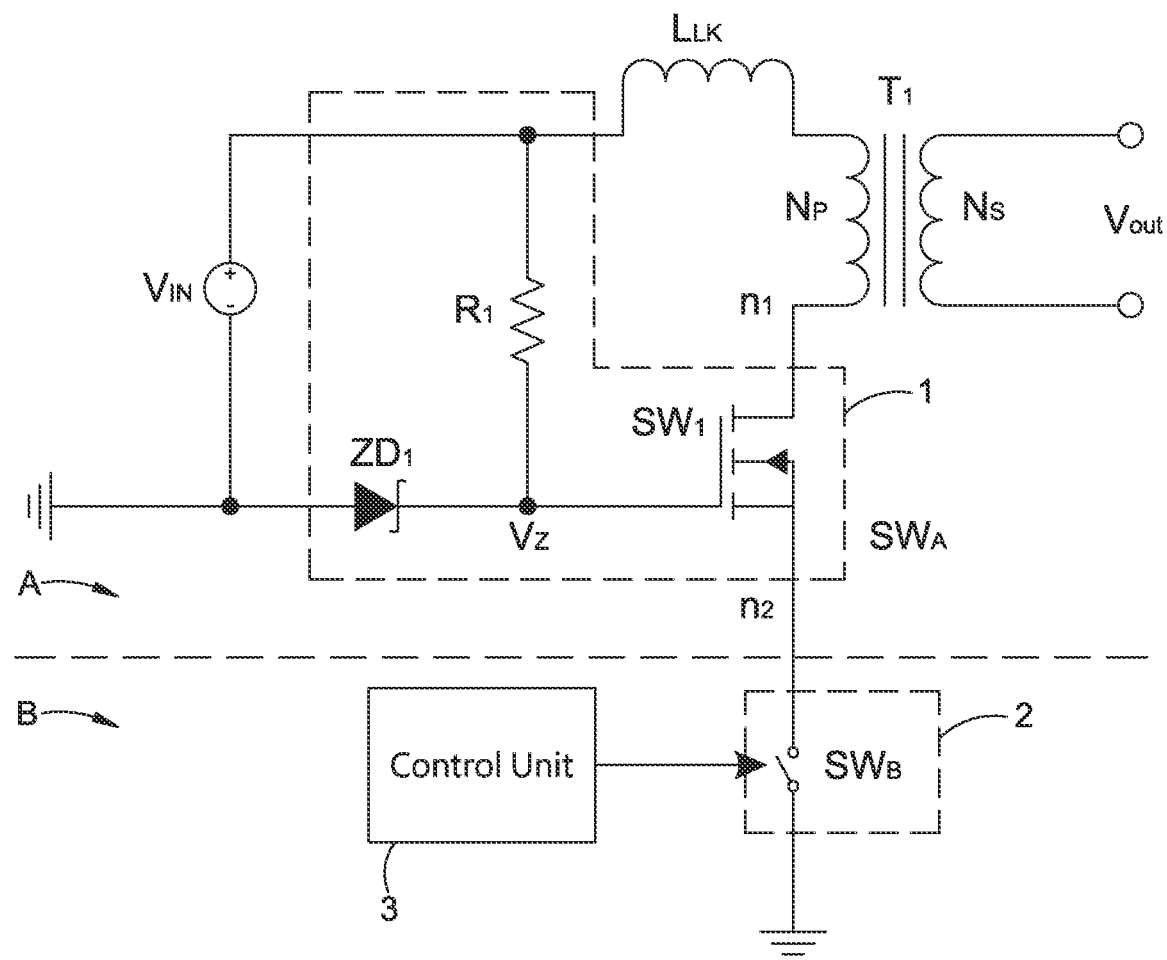
FIG. 3A shows a schematic diagram of a partial circuit of the switch control module for the switch mode power supply according to the first embodiment of the present application.

To elaborate, please refer to FIG. 3A, which shows a schematic diagram of a partial circuit of the switch control module for the switch mode power supply according to the first embodiment of the present application. In the first embodiment, the biased switch $SW_A$ comprises a first switch unit $SW_1$, which can be, for example, a metal-oxide-semiconductor field-effect transistor (MOSFET). Alternatively, the first switch unit $SW_1$ can be selected from a bipolar junction transistor (BJT), a unijunction transistor (UJT), or a silicon controlled rectifier (SCR). The present application is not limited by the above examples. The drain of the first switch unit $SW_1$ acts as a first node $n_1$ connecting to the primary side winding $N_P$; the source of the first switch unit $SW_1$ acts as a second node $n_2$ connecting to the active switch $SW_B$; and the gate of the first switch unit $SW_1$ receives a bias voltage $V_Z$. The bias voltage $V_Z$ can be provided with ease by a Zener diode $ZD_1$ and a bias resistor $R_1$. The bias resistor $R_1$ is coupled to the input power source $V_{IN}$ for providing a minimum breakdown current to the Zener diode $ZD_1$ and producing the bias voltage $V_Z$. If the first switch unit $SW_1$ has a positive threshold voltage Vth, once the bias voltage $V_Z$ is greater than the threshold voltage Vth, the first switch unit $SW_1$ will be biased to the turn-on state. In this condition, if the active switch $SW_B$ is turned off for disallowing currents to flow through the biased switch $SW_A$, the voltage of the second node $n_2$ will be raised to a maximum voltage $V_{Clamp}$ with a value of $V_Z$-Vth. Once the second node $n_2$ reaches the maximum voltage $V_{Clamp}$, the switch unit $SW_1$ will be turned off.

According to the present embodiment, because the switch state of the biased switch $SW_A$ is controlled by the switch state of the active switch $SW_B$, the active switch $SW_B$ still needs to couple to a control unit 3 for controlling the switch state of a second switch unit $SW_2$. Normally, a pulse-width modulation circuit will be adopted to generate a switch control signal. The switch control signal is output to the second switch unit $SW_2$ for adjusting its switch state and starting or stopping energy storage in the primary side winding $N_P$. In practice, a person having ordinary skill in the art can understand that the duty cycle of the switch control signal can be adjusted according to the feedback voltage of the output voltage $V_{OUT}$ for controlling the output voltage $V_{OUT}$ accurately. Since these control methods are normal schemes in the field, the details will not be described in detail.

Figure 3B:
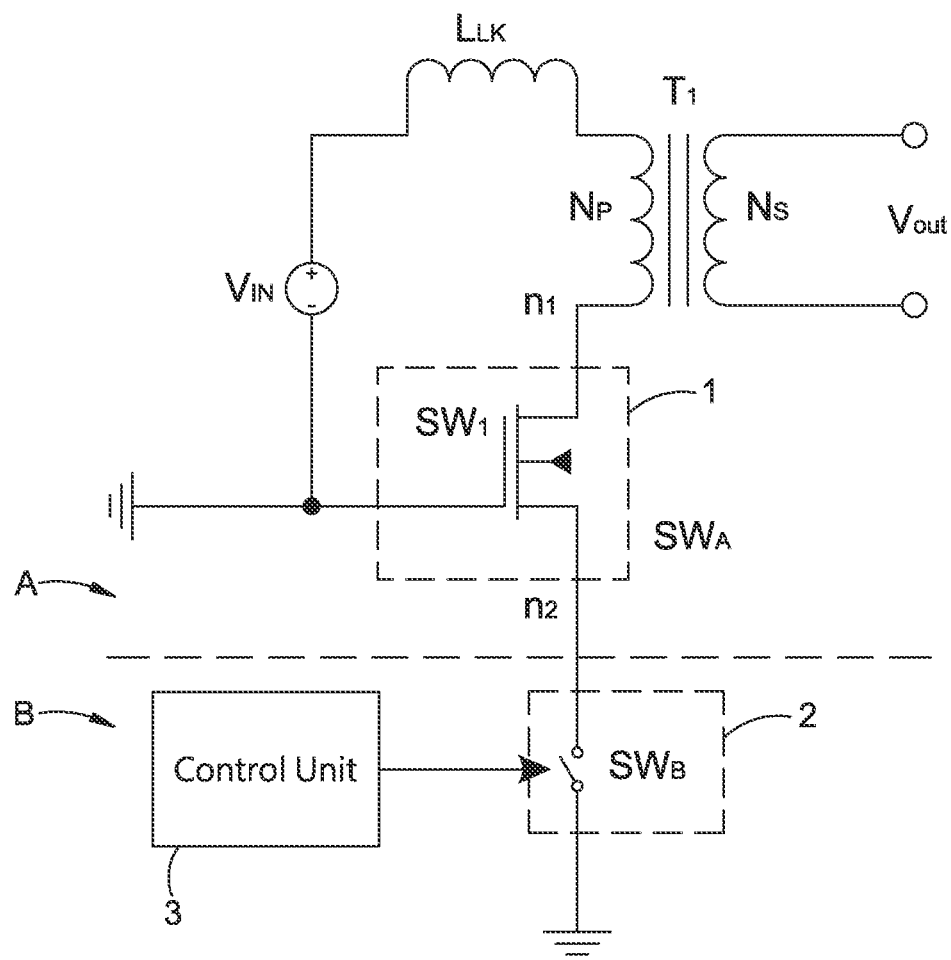
FIG. 3B shows a schematic diagram of another partial circuit of the switch control module for the switch mode power supply according to the first embodiment of the present application.

On the other hand, please refer to FIG. 3B. According to the first embodiment, a depletion-mode (D-mode) GaN MOSFET can be selected to be the first switch unit $SW_1$ of the biased switch $SW_A$. Thanks to its negative threshold voltage Vth, simply connecting the gate to the ground or controlling it at a proper reference voltage level, the first switch unit $SW_1$ will be biased to the turn-on state without additional bias components. Under this condition, if the active switch $SW_B$ is turned off for disallowing currents to flow through the biased switch $SW_A$, the maximum voltage $V_{Clamp}$ that the second node $n_2$ can be raised is $-Vth$. Once the second node $n_2$ reaches $-Vth$, the first switch unit $SW_1$ will be turned off.

In the following, FIG. 3A and FIG. 3B are first used to illustrate the first technical effects given by the switch control module for the switch mode power supply according to the present embodiment. Notice that no matter the threshold voltage Vth of the first switch unit $SW_1$ of the biased switch $SW_A$ is positive or negative, an extremely low maximum voltage $V_{Clamp}$ can be applied to the second node $n_2$ of the active switch $SW_B$. The normal threshold voltage Vth is approximately in the order of one or two digits of volts. In other words, when the control unit 3 turns off the active switch $SW_B$ for stopping energy storage in the primary side winding $N_P$, the voltage spike generated by the leakage inductance $L_{LK}$ of the primary side winding $N_P$ will raise the voltages at the first and second nodes $n_1$, $n_2$. The voltage at the second node $n_2$ will be raised to around the maximum voltage $V_{Clamp}$ then the first switch unit $SW_1$ will be turned off. Since the active switch $SW_B$ and the control unit 3 are located in the low-voltage operation region B, they can be manufactured using low-voltage components. Besides, by maintaining low voltage operation, they are less influenced and vulnerable by the voltage spikes generated by the leakage inductance $L_{LK}$.

Figure 4:
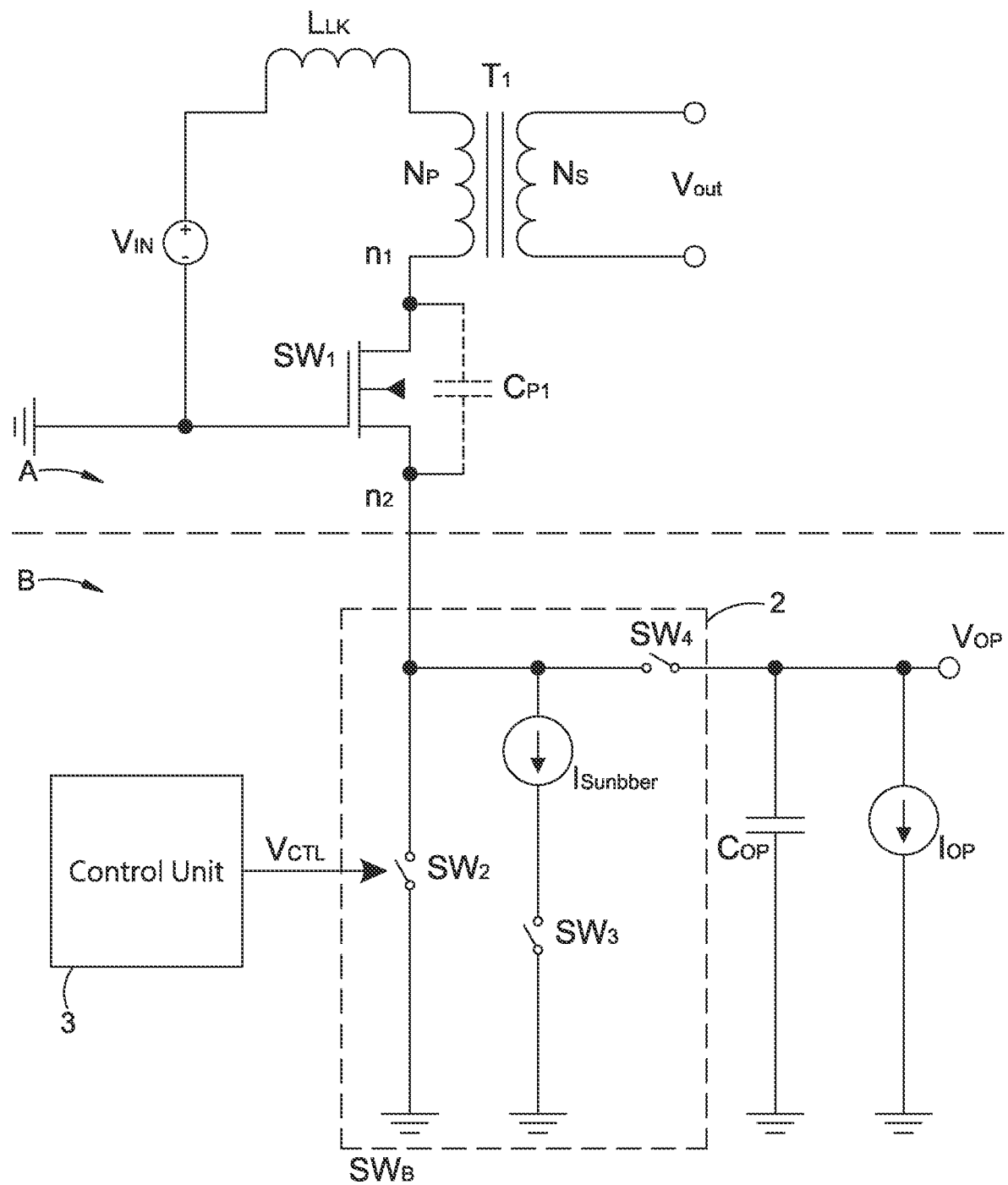
FIG. 4 shows a schematic diagram of a partial circuit of the switch control module for the switch mode power supply according to the second embodiment of the present application.

Please refer to FIG. 4, which shows a schematic diagram of a partial circuit of the switch control module for the switch mode power supply according to the second embodiment of the present application. Based on the first embodiment, the present embodiment adds a snubber to the active switch $SW_B$. The snubber is coupled to the second node $n_2$, and spontaneously guides a spike absorption current to flow through the first switch unit $SW_1$ when the active switch $SW_B$ is turned off by the control unit 3. To elaborate, in the present embodiment, the snubber comprises a current source $I_{Snubber}$ and a third switch unit $SW_3$. The current source $I_{Snubber}$ and the third switch unit $SW_3$ can be connected in series, coupled to the second node $n_2$, and connected in parallel with the second switch unit $SW_2$. Likewise, since the current source $I_{Snubber}$ and the third switch unit $SW_3$ are connected in series, the placement of the components does not influence the operation.

Figure 5:
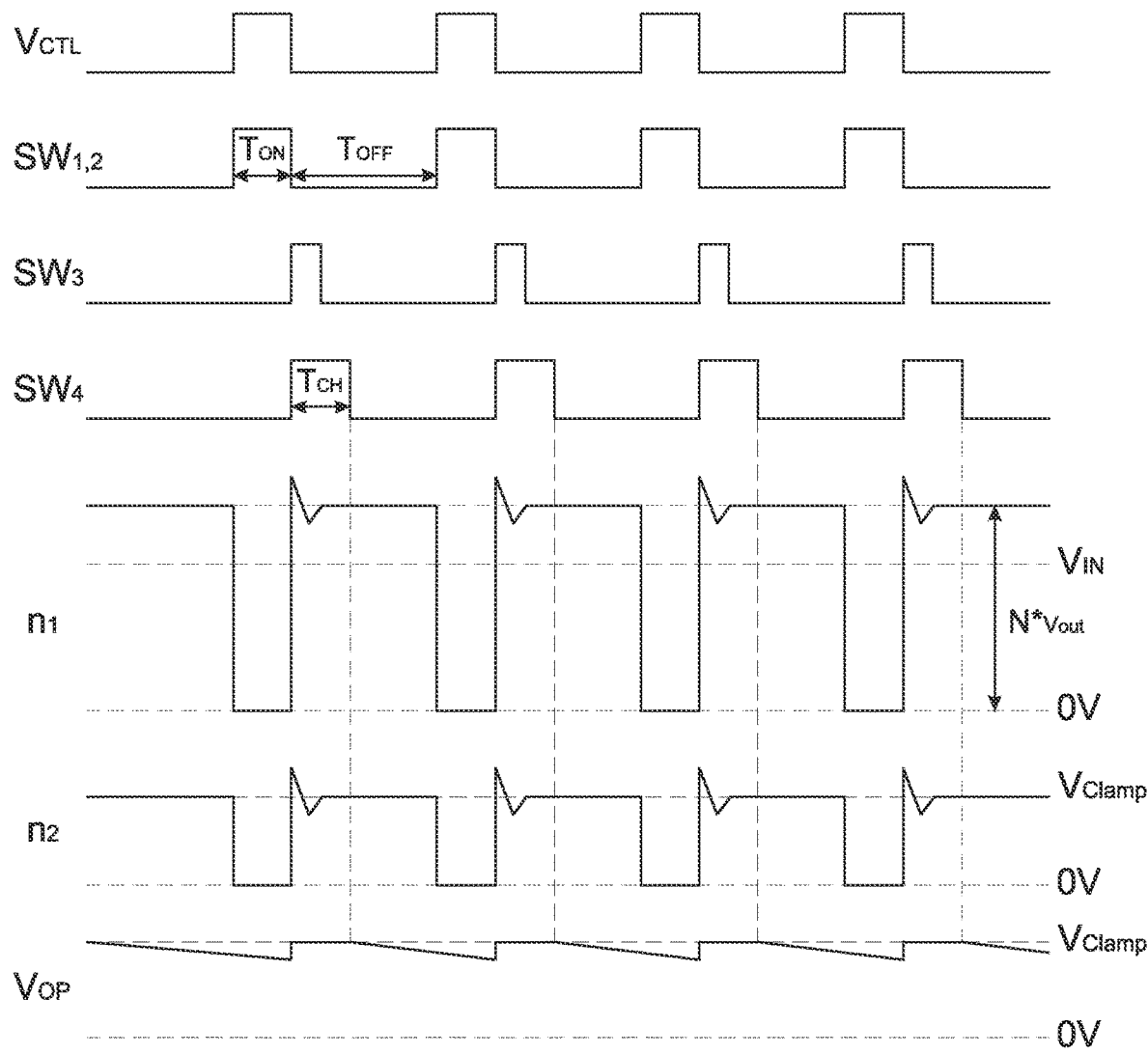
FIG. 5 shows the signals of the switch control module according to the second embodiment of the present application.

The control unit 3 will output a switch control signal $V_{CTL}$ to the control terminal of the second switch unit $SW_2$. If the second switch unit $SW_2$ is also a MOSFET, the control unit 3 is coupled to the gate of the second switch unit $SW_2$ for outputting the switch control signal $V_{CTL}$. For example, FIG. 5 shows the signals of the switch control module. In the example, the second switch unit $SW_2$ will be turned on when the switch control signal $V_{CTL}$ is high and off when the switch control signal $V_{CTL}$ is low. When the second switch unit $SW_2$ is turned off, although the voltage spike generated by the leakage inductance $L_{LK}$ of the primary side winding $N_P$ will raise the voltage at the first node $n_1$, the voltage at the first node $n_1$ will be coupled to the second node $n_2$ via a parasitic capacitance $C_{P1}$ for raising the voltage at the second node $n_2$. The maximum voltage of the first node $n_1$ can be raised to the voltage of the input power source $V_{IN}$, which is approximately equal to N times the output voltage $V_{OUT}$ with N being the turn ratio of the primary side winding $N_P$ to the secondary side winding $N_S$. However, the voltage at the second node $n_2$ will turn off the first switch unit $SW_1$ around the maximum voltage $V_{Clamp}$. At this moment, to lower the voltage rising rate at the first and second nodes $n_1$, $n_2$, the third switch unit $SW_3$ can be turned on for allowing the current provided by the current source $I_{Snubber}$ to flow through the first switch unit $SW_1$. Consequently, the first switch unit $SW_1$ will not be turned off immediately and the current source $I_{Snubber}$ can dissipate the energy stored in the leakage inductance $L_{LK}$. In addition to slowing the rising rate of the voltages at the first and second nodes $n_1$, $n_2$, if the current provided by the current source $I_{Snubber}$ is sufficient, the maximum voltage at the first node $n_1$ can be reduced and thus reducing effectively the voltage spikes caused by the leakage inductance $L_L$ of the primary side winding $N_P$. Thereby, the influence of voltage spikes on the components in the high-voltage operation region A can be further reduced.

On the other hand, the active switch $SW_B$ can further include a fourth switch unit $SW_4$, which can be coupled between the second node $n_2$ and a power source terminal $V_{OP}$. The power source terminal $V_{OP}$ can be simply coupled to an output capacitor $C_{OP}$ or a complete voltage stabilizing circuit for generating a direct-current power source by using the voltage at the second node $n_2$. In addition, the power source terminal $V_{OP}$ can be coupled to the control unit 3 or any other circuit components requiring a direct-current power source. When the fourth switch unit $SW_4$ is turned on, the direct-current power source formed at the second node $n_2$ can be supplied to the control unit 3 via the power source terminal $V_{OP}$. As shown in the figure, the other current source Iop is used for representing the operation current drawn from the power source terminal $V_{OP}$ by the control unit 3 or other circuit components. Thereby, the power consumption of the switch mode power supply can be reduced effectively.

When the second switch unit $SW_2$ is turned on in a duration $T_{ON}$, the voltage at the second node $n_2$ will be pulled low. To supply power to the control unit 3 with a more stable power source, the fourth switch unit $SW_4$ should preferably be turned on for a supply duration $T_{CH}$ when the second switch unit $SW_2$ is turned off (namely, in a $T_{OFF}$ duration). The supply duration $T_{CH}$ is equivalently the charging time to the output capacitor $C_{OP}$ by the voltage at the second node $n_2$. Besides, the supply duration $T_{CH}$ can be determined according to the power consumption of the control unit 3 or other circuit components requiring a direct-current power source.

It is noteworthy that the total power $P_{absorb}$ of spontaneously absorbing the energy stored in the leakage inductance $L_{LK}$ according to the second embodiment can be roughly expressed by the following equation, where $I_{Snubber}$ is the current provided by the current source $I_{Snubber}$ as described above; $V_{n1}$ is the voltage at the first node $n_1$; and $V_{n2}$ is the voltage at the second node $n_2$:

$$P_{absorb} \cong \left(I_{Snubber} + \frac{C_{OP} \times \Delta V_{OP}}{T_{CH}}\right) \times \left(V_{n_1} - V_{n_2}\right)$$

Accordingly, if the operation current drawn by the control unit 3 or other circuit components requiring a direct-current power source from the power source terminal $V_{OP}$ is sufficient, the maximum voltage at the first node $n_1$ is actually lowered, which further effectively reduces the voltage spikes caused by the leakage inductance $L_{LK}$ of the primary side winding $N_P$. In general, this happens to the switch mode power supplies with lower power or the cases when the power source terminal $V_{OP}$ supplies to numerous components. For these scenarios, the switch control module for the switch mode power supply according to the second embodiment of the present application requires no snubber. In other words, the current source $I_{Snubber}$ and the third switch unit $SW_3$ as described above are no longer required. Thereby, the voltage spikes caused by the leakage inductance $L_{LK}$ of the primary side winding $N_P$ can be reduced effectively.

Moreover, in practice, the present application absorbs the energy stored in the leakage inductance $L_{LK}$ by using the voltage difference between the two terminals of the biased switch $SW_A$ and resulting in the generation of heat. As described above, the biased switch $SW_A$ can be formed by the switch transistor adopted by the switch mode power supply according to the prior art, meaning that the first switch unit $SW_1$ is itself an existing external component. In general, the switch mode power supply will include heat dissipating structures for the switch transistors. Thereby, no additional heat dissipating structure is required for the first switch unit $SW_1$. Namely, in practice, no additional external component or heat dissipating structure is required for the switch control module for the switch mode power supply according to the various embodiments of the present application for absorbing the energy stored in the leakage inductance $L_{LK}$ and hence the overall manufacturing costs can be reduced significantly.

Furthermore, according to the U.S. Pat. No. 10,622,879, as described above, the energy generated by the leakage inductance of the primary side winding is directly used to charge a capacitor for providing an operation current to the control unit. Nonetheless, according to the second embodiment, the voltage at the second node $n_2$ is used to generate the direct-current power source. As described above, the voltage at the second node $n_2$ at most will be raised to around the maximum voltage $V_{Clamp}$. Thereby, the second embodiment is suitable for switch mode power supplier with high power without using electronic components with medium to high voltage tolerance to manufacture the control unit 3. Consequently, the application range of the switch control module is increased significantly.

Figure 6:
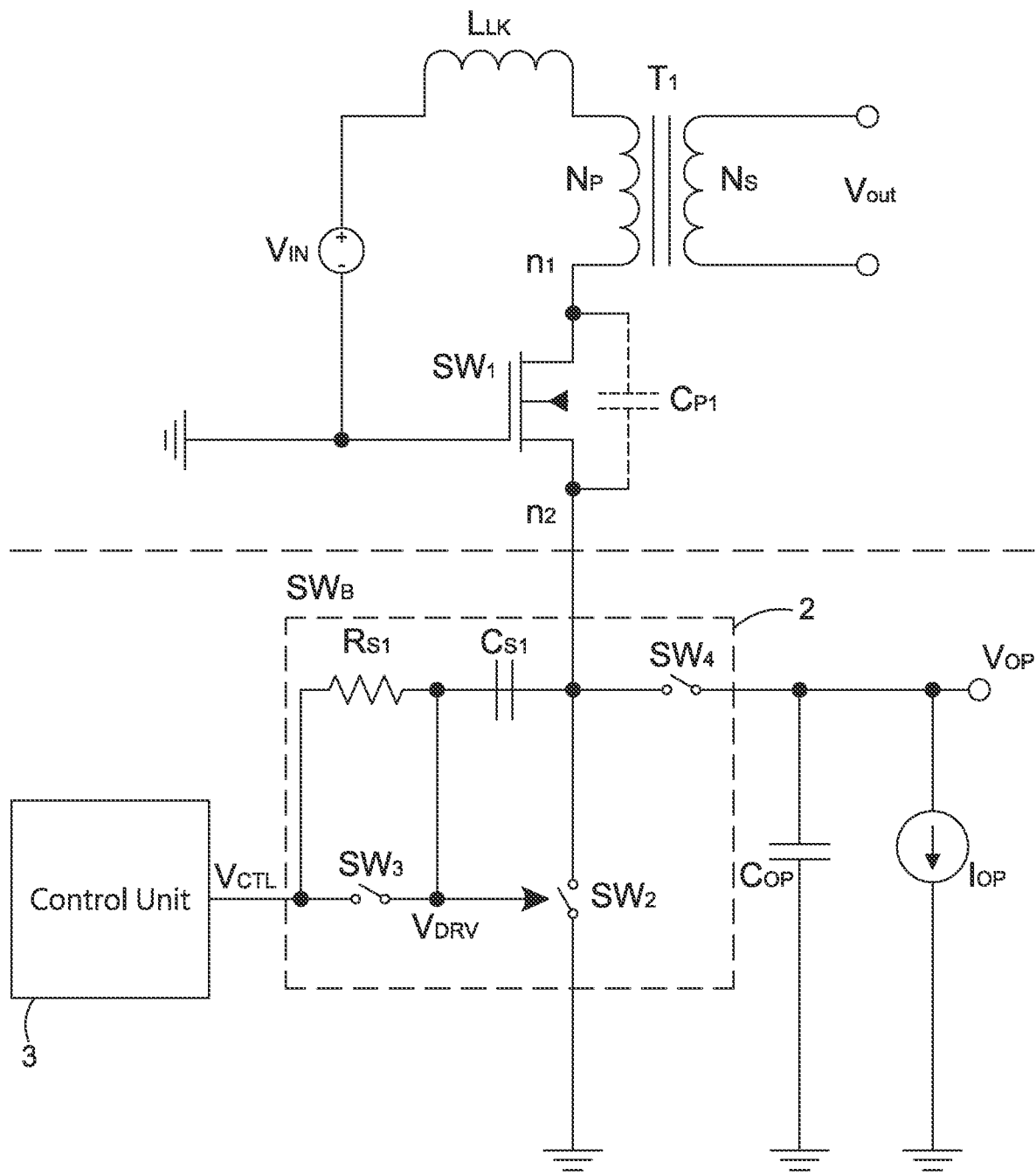
FIG. 6 shows a schematic diagram of a partial circuit of the switch control module for the switch mode power supply according to the third embodiment of the present application.

Please refer to FIG. 6, which shows a schematic diagram of a partial circuit of the switch control module for the switch mode power supply according the third embodiment of the present application. The difference between the third embodiment and the second is that, according to the third embodiment, the snubber disposed in the active switch $SW_B$ requires no current source. According to the present embodiment, the snubber comprises a coupling resistor $R_{S1}$ and a coupling capacitor $C_{S1}$. The control unit 3 is coupled to the control terminal of the second switch unit $SW_2$ via a third switch unit $SW_3$. The coupling resistor $R_{S1}$ is coupled between the control unit 3 and the control terminal of the second switch unit $SW_2$; the coupling capacitor $C_{S1}$ is coupled between the control terminal of the second switch unit $SW_2$ and the second node $n_2$. Thereby, a driving voltage $V_{DRV}$ received by the control terminal of the second switch unit $SW_2$ will be influenced by the control unit 3 and the second node $n_2$ concurrently.

Figure 7:
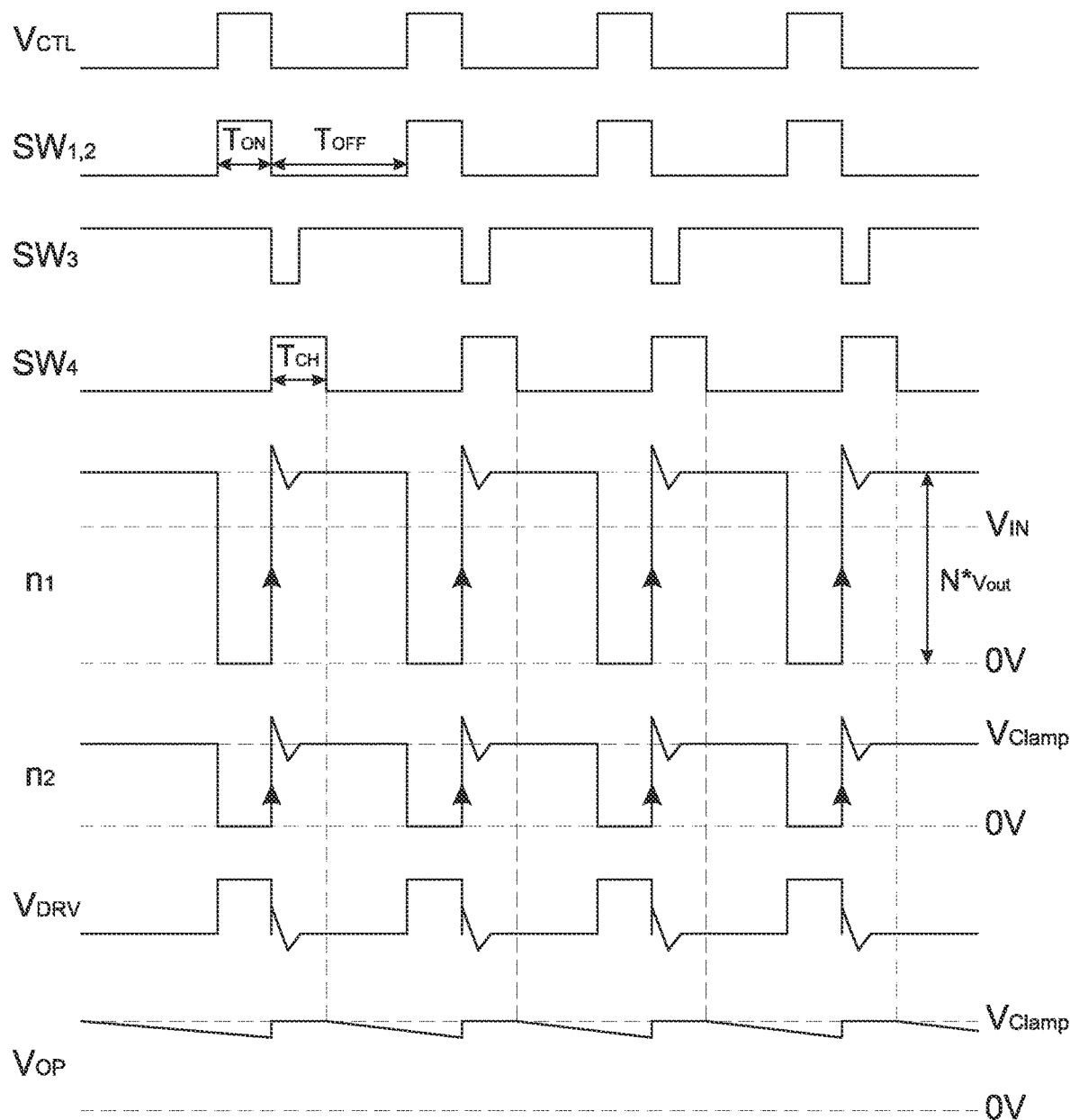
FIG. 7 shows the signals of the switch control module according to the third embodiment of the present application.

For example, please refer to FIG. 7, which shows the signals of the switch control module according the third embodiment of the present application. In this example, the second switch unit $SW_2$ will be turned on when the driving voltage $V_{DRV}$ is high and turned off when the driving voltage $V_{DRV}$ is low. When the switch control signal $V_{CTL}$ changes from the high voltage level to the low voltage level, it will be output to the second switch unit $SW_2$ via the third switch unit $SW_3$ for shutting off the second switch unit $SW_2$ immediately. Nonetheless, according to the present embodiment, the third switch unit $SW_3$ is turned off when the switch control signal $V_{CTL}$ changes from the high voltage level to the low voltage level. At this moment, the switch control signal $V_{CTL}$ must pull low the driving voltage $V_{DRV}$ via coupling resistor $R_{S1}$. Unfortunately, in the process of turning off the second switch unit $SW_2$ as the driving voltage $V_{DRV}$ is lowering, although a voltage spike generated by the leakage inductance $L_{LK}$ of the primary side winding $N_P$ can pull up the voltages at the first and second nodes $n_1$, $n_2$, the voltage at the second node $n_2$ will be coupled to the control terminal of the second switch unit $SW_2$ via the coupling capacitor $C_{S1}$ and influencing the driving voltage $V_{DRV}$. Thereby, as shown in the figure, given the influence on the driving voltage $V_{DRV}$ as described above, the control result is equivalent to not turning off the second switch unit $SW_2$ and maintaining in an incomplete shutoff state temporarily. Consequently, a spike absorption current will be formed to flow through the first switch unit $SW_1$. According to the present embodiment, although no current source is disposed to form the snubber like the second embodiment, a spike absorption current still can be guided spontaneously to flow through the first switch unit $SW_1$ when the active switch $SW_B$ is turned off by the control unit 3 by disposing coupling components to determine the driving voltage $V_{DRV}$ output to the second switch unit $SW_2$. Thereby, the purpose of lowering voltage spike can still be achieved.

Figure 8:
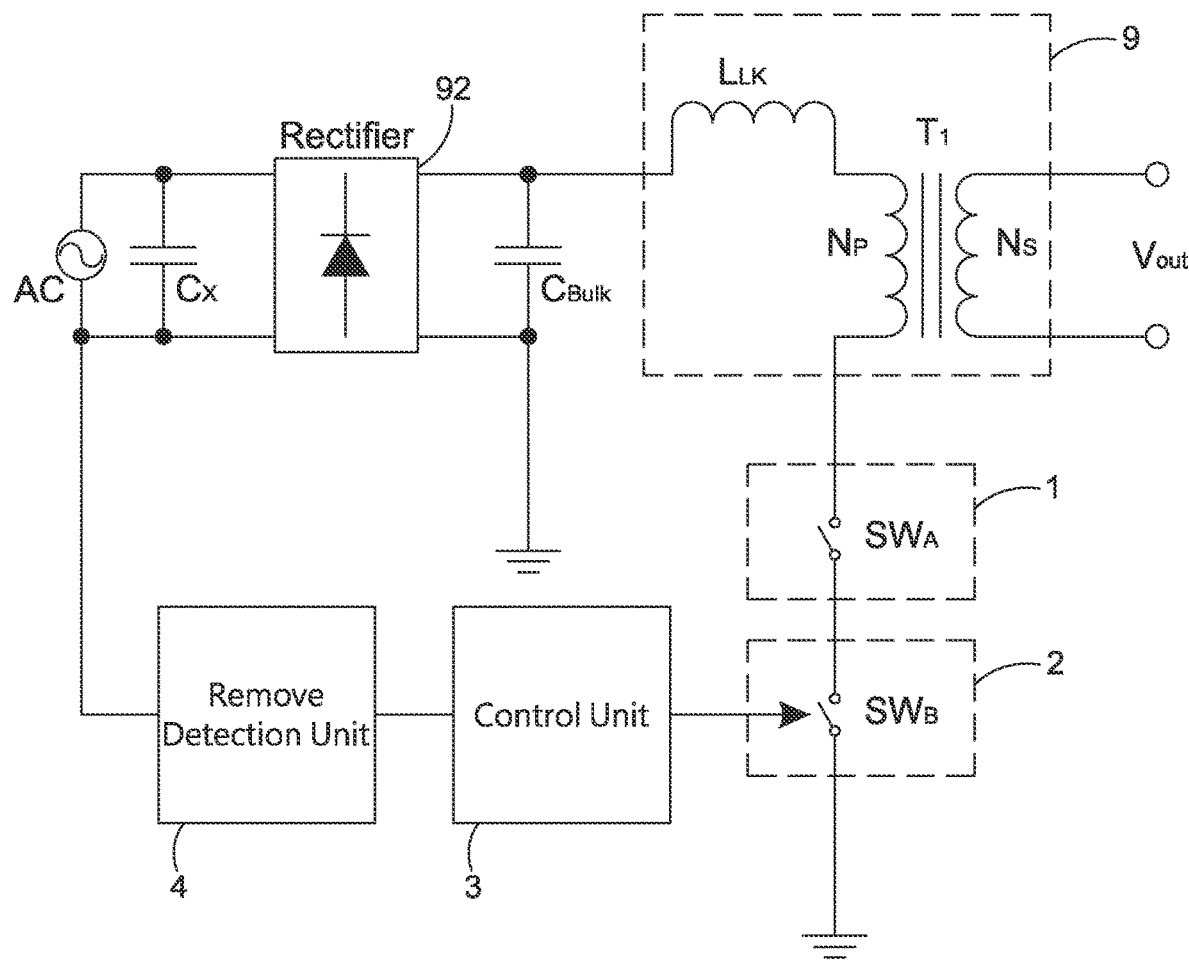
FIG. 8 shows a schematic diagram of the application architecture for the switch control modules according to the various embodiments of the present application.

Please refer to FIG. 8, which shows a schematic diagram of the application architecture for the switch control modules according to the various embodiments of the present application. The input power source $V_{IN}$ in the previous description is generally formed by rectifying external alternate-current power source. FIG. 8 shows the circuit architecture of how to rectify an external alternate-current power source AC. A voltage stabilizing capacitor $C_X$ is connected to one side of the external alternate-current power source AC for filtering and stabilizing the voltage of the external alternate-current power source AC. Next, the voltage stabilizing capacitor $C_X$ the will be connected to an input capacitor $C_{Bulk}$ via a rectifier 92. The voltage across the input capacitor $C_{Bulk}$ is rectified by the rectifier 92 so that the input capacitor $C_{Bulk}$ can provide the input power source $V_{IN}$ as described above to the winding unit 9.

A person having ordinary skill in the art should know well that the external alternate-current power source AC is relatively a high voltage for human body, making safety concern on the voltage across the voltage stabilizing capacitor $C_X$. To meet high-standard safety regulations, a normal switch mode power supply must include an additional discharge circuit for spontaneously releasing the charges stored in the voltage stabilizing capacitor $C_X$ after the external alternate-current power source AC is removed (such as unplugging). Unfortunately, such a discharge circuit needs to adopt a high-voltage device in the integrated-circuit fabrication process, leading to extra manufacturing costs.

Figure 1:
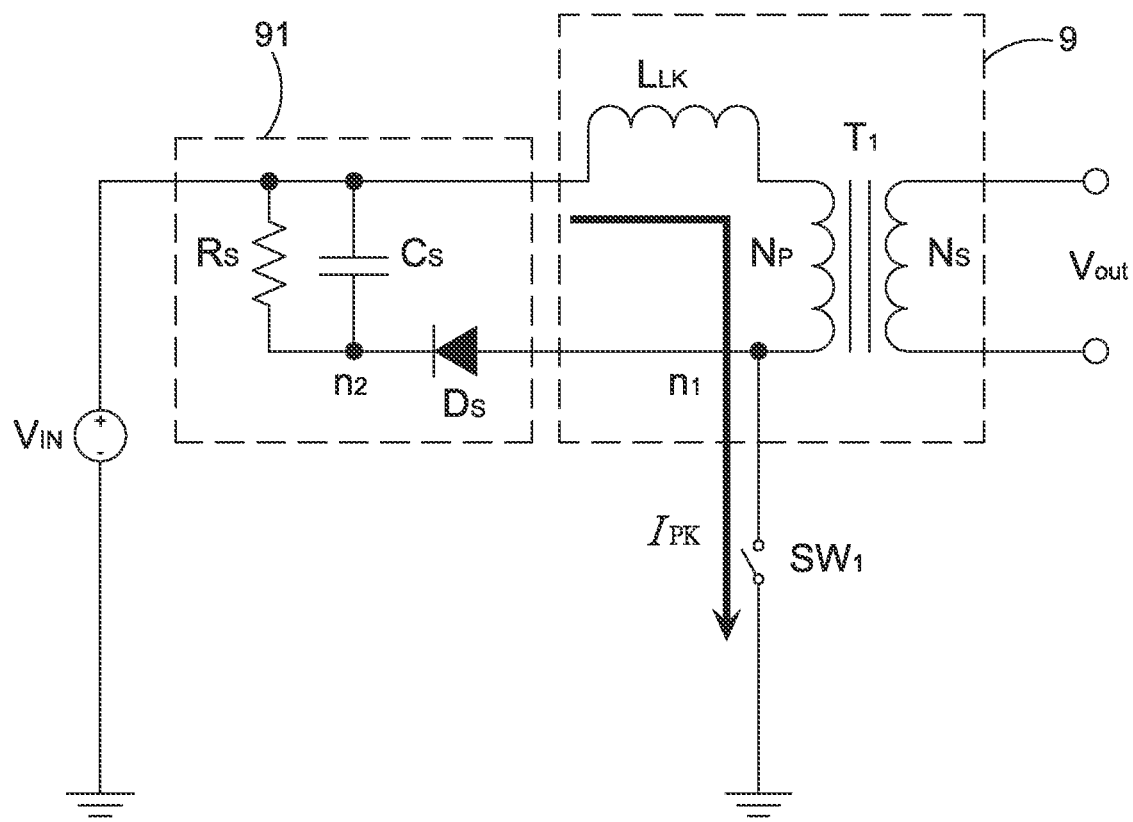
FIG. 1 shows a schematic diagram of the switch mode power supply according to the prior art.

On the contrary, the switch control module for the switch mode power supply according to the present embodiment of the present application requires no additional discharge circuit. To elaborate, since the voltage at the second node $n_2$ can supply power to the control unit 3 indirectly, only one remove detection unit 4 is required to judge if the external alternate-current power source AC has been removed. The remove detection unit 4 is coupled to the control unit 3 for controlling the control unit 3 to continue to switch the active switch $SW_B$ when the external alternate-current power source AC is judged to be removed. Thereby, the energy in the input capacitor $C_{Bulk}$ can be released by the active switch $SW_B$ continuously and the energy in the voltage stabilizing capacitor $C_X$ can be transferred to the input capacitor $C_{Bulk}$ via the rectifier 92. The above operation is equivalent to releasing the charges stored in the voltage stabilizing capacitor $C_X$ continuously. The power to the control unit 3 will be continued until the voltage across the input capacitor $C_{Bulk}$ approaches zero. In other words, according to the various embodiments of the present application, without no addition discharge circuit, the charges stored in the voltage stabilizing capacitor $C_X$ can be released spontaneously and hence effectively lowering the overall manufacturing costs of switch mode power supply. Note that according to the switch mode power supply according to the prior art as shown in FIG. 1, the power should be supplied to the control unit for controlling the switch state of the switch transistor $SW_1$. The power of this control unit is normally supplied by an auxiliary winding by inducing the energy in the secondary side winding $N_S$ of the winding unit 9. Unfortunately, the secondary side winding $N_S$ normally stops drawing current as soon as the external alternate-current power source AC is removed. Consequently, using the auxiliary winding according to the prior art cannot maintain the operation of the control unit when the external alternate-current power source AC is removed.

The second switch unit $SW_2$, the third switch unit $SW_3$, or the fourth switch unit $SW_4$ in the various embodiments as described above can be manufactured, likewise, by a MOSFET. Alternatively, they can be selected from BJT, UJT, SCR, or other power switching devices. Nonetheless, the present application is not limited by the above examples.

To sum up, according to the switch control module for the switch mode power supply in the above embodiments, the active switch $SW_B$ controls the switch state of the biased switch $SW_A$ connected in series via a node (the second node $n_2$ described above). Thereby, when the primary side winding $N_P$ of the winding unit 9 stops storing energy, a voltage spike generated by the leakage inductance $L_{LK}$ of the primary side winding $N_P$ can raise the voltage of the node to around a maximum voltage $V_{Clamp}$ then the biased switch $SW_A$ will be turned off. Thereby, the control unit 3 controlling the active switch $SW_B$ can be manufactured using low-voltage components. In addition, by maintaining low-voltage operations, the influence and damage caused by the voltage spike generated by the leakage inductance $L_{LK}$ can be avoided.

According to some embodiments, the active switch $SW_B$ comprises a snubber for spontaneously guiding a spike absorption current to flow through the biased switch $SW_A$ for absorbing the energy stored in the leakage inductance $L_{LK}$ when the active switch $SW_B$ is controlled to turn off. According to some embodiments, the voltage at the node can generate a direct-current power source for supplying power to the control unit coupled to the active switch $SW_B$ or to other circuit components requiring direct-current power source. Thereby, the power consumption of switch mode power supply can be reduced effectively. Besides, since the voltage at the node can be raised at most to around the maximum voltage $V_{Clamp}$, the present application is suitable for switch mode power supplies with higher power, not requiring electronic components with medium to high voltage tolerance for the control unit. Consequently, the application range of the switch control module is increased significantly.

In practice, the present application absorbs the energy stored in the leakage inductance $L_{LK}$ by using the biased switch $SW_A$ and resulting in the generation of heat. As described above, the biased switch $SW_A$ itself can be an existing external component of switch mode power supply. In general, the switch mode power supply will include heat dissipating structures. Thereby, in practice, no additional external component or heat dissipating structure is required for the switch control module for the switch mode power supply according to the various embodiments of the present application for absorbing the energy stored in the leakage inductance $L_{LK}$ and hence the overall manufacturing costs can be reduced significantly.

The foregoing description is only embodiments of the present application. Those equivalent changes or modifications made according to the shape, structure, feature, or spirit described in the claims of the present application are within the scope and range of the present application.

The invention claimed is:

1. A switch control module, applied for a switch mode power supply, said switch power supply comprising a primary side winding and a secondary side winding, and said switch control module comprising:
    a biased switch, comprising a first node and a second node, and said first node coupled to said primary side winding;
    an active switch, connected to said second node; and
    a control unit, coupled to said active switch for controlling a switch state of said active switch;
    wherein said biased switch is biased to a turn-on state, said biased switch further comprises a first switch unit; said biased switch is biased to turn on said first switch unit; when said control unit controls said active switch to turn off, the voltage at said second node will be raised to approaching a maximum voltage and turning off the said first switch unit.

2. The switch control module of claim 1, wherein first switch unit is a metal-oxide-semiconductor field-effect transistor; the drain and source of said first switch unit act as said first node and said second node, respectively; the gate of said first switch unit receives a bias voltage; and the difference between said bias voltage and the threshold voltage of said first switch unit is said maximum voltage.

3. The switch control module of claim 1, wherein said active switch comprises a second switch unit; and said control unit outputs a switch control signal to a control terminal of said second switch unit for controlling the turn-on or turn-off of said second switch unit.

4. The switch control module of claim 3, wherein said active switch comprises a snubber coupled to said second node; and said snubber guides a spike absorption current to flow through said biased switch when said second switch unit is turned off by said control unit.

5. The switch control module of claim 4, wherein said snubber comprises a current source and a third switch unit; and said current source and said third switch unit are connected in series for coupling to said second node.

6. The switch control module of claim 4, wherein said control unit is coupled to said control terminal of said second switch unit via a third switch unit; said snubber comprises a first coupling device and a second coupling device; said first coupling device is coupled between said control unit and said control terminal of said second switch unit; and said second coupling device is coupled between said control terminal of said second switch unit and said second node.

7. The switch control module of claim 6, wherein said second switch unit is turned on when said switch control signal is at a first level; said second switch unit is turned off when said switch control signal is at a second level; and said third switch unit is turned off when said switch control signal charge from said first level to said second level.

8. The switch control module of claim 3, wherein said active switch comprises a fourth switch unit coupled between said second node and a power source terminal; and said power source terminal is coupled to a voltage stabilizing circuit for generating a direct-current power source using the voltage at said second node.

9. The switch control module of claim 8, wherein said voltage stabilizing circuit comprises an output capacitor.

10. The switch control module of claim 8, wherein said fourth switch unit is selectively turned on in a supply duration when said second switch unit is turned off.

11. The switch control module of claim 8, wherein said power source terminal is coupled to said control unit for providing said direct-current power source to said control unit.

* * * * *